United States Patent
Xiang

(10) Patent No.: US 10,008,871 B2
(45) Date of Patent: Jun. 26, 2018

(54) ELECTRONIC CIGARETTE CASE AND METHOD FOR DETECTING BATTERY ROD INSERTION INTO OR REMOVAL FROM ELECTRONIC CIGARETTE CASE

(71) Applicant: HUIZHOU KIMREE TECHNOLOGY CO., LTD. SHENZHEN BRANCH, Shenzhen, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 42 days.

(21) Appl. No.: 14/917,634

(22) PCT Filed: Jan. 10, 2014

(86) PCT No.: PCT/CN2014/070486
§ 371 (c)(1),
(2) Date: Mar. 9, 2016

(87) PCT Pub. No.: WO2015/035741
PCT Pub. Date: Mar. 19, 2015

(65) Prior Publication Data
US 2016/0226286 A1    Aug. 4, 2016

(30) Foreign Application Priority Data

Sep. 10, 2013   (CN) .................... 2013 2 0560850 U

(51) Int. Cl.
*H02J 7/00*     (2006.01)
*A24F 15/18*    (2006.01)
(Continued)

(52) U.S. Cl.
CPC ............ *H02J 7/0054* (2013.01); *A24F 15/18* (2013.01); *A24F 47/002* (2013.01); *H01M 10/44* (2013.01);
(Continued)

(58) Field of Classification Search
CPC ........ H02J 7/0054; H02J 7/027; H02J 7/0006; H01M 10/44; H01M 10/46; H01M 2220/30; A24F 47/002; A24F 47/008; A24F 15/18
See application file for complete search history.

(56) References Cited

U.S. PATENT DOCUMENTS 5,517,434 A * 5/1996 Hanson .................... B60R 11/02
361/679.41
6,011,416 A * 1/2000 Mizuno .............. H03K 17/0822
327/108
(Continued)

FOREIGN PATENT DOCUMENTS

WO    WO 9608068 A1 * 3/1996 ............ H02J 7/0006

*Primary Examiner* — Naum B Levin

(57) ABSTRACT

An electronic cigarette and a method for detecting battery rod insertion into or removal from an electronic cigarette case. The electronic cigarette case is used for charging an electronic cigarette battery rod having a built-in magnet. The electronic cigarette case comprises: a microprocessor, a Hall sensor module, a battery rod charging interface and a charging circuit. The Hall sensor module is connected to the microprocessor. The charging circuit is connected to the microprocessor. The battery rod charging interface is connected to the charging circuit. The beneficial effect is that insertion or removal of a battery rod can be accurately identified on the basis of changes in a magnetic field, thus controlling the turning-on or turning-off of the charging circuit, providing a user with a novel charging scheme, better meeting customer needs, and enhancing user experience.

14 Claims, 5 Drawing Sheets

(51) Int. Cl.
*H01M 10/44* (2006.01)
*H01M 10/46* (2006.01)
*H02J 7/02* (2016.01)
*A24F 47/00* (2006.01)

(52) U.S. Cl.
CPC ........... *H01M 10/46* (2013.01); *H02J 7/0006* (2013.01); *H02J 7/027* (2013.01); *A24F 47/008* (2013.01); *H01M 2220/30* (2013.01)

(56) References Cited

U.S. PATENT DOCUMENTS

| | | | | |
|---|---|---|---|---|
| 6,331,744 | B1* | 12/2001 | Chen | A47J 36/26 310/171 |
| 7,446,501 | B2* | 11/2008 | Aleyraz | H01M 8/04365 320/101 |
| 7,620,475 | B1* | 11/2009 | Bottazzi | G06Q 20/343 235/383 |
| 7,847,515 | B2* | 12/2010 | Schroeck | H01M 2/1022 320/106 |
| 8,021,292 | B2* | 9/2011 | Sotiriou | H02P 7/2913 600/9 |
| 8,129,955 | B2* | 3/2012 | White | H01M 2/1022 320/150 |
| 8,319,475 | B2* | 11/2012 | Choksi | B25F 5/00 320/106 |
| 8,446,046 | B2* | 5/2013 | Fells | H02J 5/005 307/104 |
| 8,629,654 | B2* | 1/2014 | Partovi | H01F 5/003 320/108 |
| 9,197,086 | B2* | 11/2015 | Zhou | H02J 7/0052 |
| 9,281,695 | B2* | 3/2016 | Cruise | H02J 7/0006 |
| 9,339,062 | B2* | 5/2016 | Hon | A24F 47/008 |
| 2004/0157116 | A1* | 8/2004 | Perkins | H01M 2/1055 429/99 |
| 2008/0309285 | A1* | 12/2008 | Choksi | B25F 5/00 320/106 |
| 2009/0072783 | A1* | 3/2009 | Gaspar | A01M 1/2033 320/108 |
| 2010/0013432 | A1* | 1/2010 | Toya | H02J 7/0027 320/108 |
| 2010/0084918 | A1* | 4/2010 | Fells | H02J 5/005 307/32 |
| 2011/0175571 | A1* | 7/2011 | Renken | H01M 10/46 320/112 |
| 2012/0074901 | A1* | 3/2012 | Mohammed | B60L 11/1842 320/109 |
| 2012/0256585 | A1* | 10/2012 | Partovi | H01F 5/003 320/108 |
| 2013/0002224 | A1* | 1/2013 | Lin | H02M 1/36 323/285 |
| 2016/0206000 | A1* | 7/2016 | Lord | A24F 47/008 |

* cited by examiner

ELECTRONIC CIGARETTE CASE AND METHOD FOR DETECTING BATTERY ROD INSERTION INTO OR REMOVAL FROM ELECTRONIC CIGARETTE CASE

TECHNICAL FIELD

The present application relates to an electronic cigarette, and more particularly relates to an electronic cigarette case and method for detecting battery rod insertion into or removal from electronic cigarette case.

BACKGROUND

When the electronic cigarette is charging by the electronic cigarette case, the external power supply mainly supplies electrical power to the electronic cigarette case via a DC power port, then charges the electronic cigarette battery rod inserted into the electronic cigarette case through a charging circuit built-in the electronic cigarette case. Or the internal battery of the electronic cigarette case charges the electronic cigarette battery rod inserted into the electronic cigarette case through a charging circuit in the electronic cigarette case.

When an electronic cigarette battery rod should be charged, whether it is inserted into the electronic cigarette case should be detected at first. If the answer is positive, a trigger signal would be generated for charging the electronic cigarette battery rod. In the prior art, the trigger signal is generated by a mechanical trigger switch. The microprocessor in the electronic cigarette case controls the charging circuit to switch on for charging the battery terminal after receiving the trigger signal generated by a mechanical trigger switch.

The generation of the trigger signal in the prior art requires the user to manually open the trigger switch, so can not meet consumer demand, and need to be improved.

SUMMARY

An objective of this invention is, aimed to the above disadvantage in the prior art, providing an electronic cigarette case and method for detecting battery rod insertion into or removal from electronic cigarette case.

According to a first aspect, an electronic cigarette case for charging an electronic cigarette battery rod is provided, which including a microprocessor, a Hall sensor module, a battery rod charging interface, and a charging circuit.

The Hall sensor module is connected to the microprocessor. The charging circuit is connected to the microprocessor.

The battery rod charging interface is connected to the charging circuit. The battery rod charging interface is used for receiving the electronic cigarette battery rod having a built-in magnet.

The Hall sensor module is used for detecting magnetic signals generated by inserting the electronic cigarette battery rod into the battery rod charging interface or removing the electronic cigarette battery rod from the battery rod charging interface, and for outputting different level signals to the microprocessor according to different magnetic signals.

The microprocessor is used for controlling the charging circuit to switch on or off according to the level signals from the Hall sensor module, so as to charge the electronic cigarette battery rod inserted into the battery rod charging interface or stop charging the electronic cigarette battery rod removed from the battery rod charging interface.

Preferably, the charging circuit further includes a charging management and over-voltage protection circuit, an overcurrent and full-charge detection circuit, and a boosting circuit.

The charging management and over-voltage protection circuit is connected to an external power supply, the microprocessor and the boosting circuit, respectively. The boosting circuit is connected to the microprocessor, the charging management and over-voltage protection circuit and the battery rod charging interface, respectively. The overcurrent and full-charge detection circuit is connected to the microprocessor and the battery rod charging interface, respectively.

The charging management and over-voltage protection circuit is used for providing a first charging voltage and implementing an overvoltage protection, when the external power supply is accessed.

The boosting circuit is used for adjusting the first charging voltage to charge the electronic cigarette battery rod.

The overcurrent and full-charge detection circuit is used for detecting a charging current during a charging process of the electronic cigarette battery rod.

The microprocessor is used for controlling a work state of the boosting circuit according to the charging current for adjusting the same.

Preferably, the electronic cigarette case further includes a built-in battery. The charging circuit further includes a built-in battery protection circuit and a built-in battery low-voltage detection circuit.

The built-in battery is connected to the boosting circuit, the built-in battery protection circuit is connected to the built-in battery, and the built-in battery low-voltage detection circuit is connected to the microprocessor and the built-in battery, respectively.

The built-in battery is used for providing a second charging voltage which charges the electronic cigarette battery rod inserted into the battery rod charging interface, after being adjusted by the boosting circuit.

The built-in battery protection circuit is used for an over-current protection of the built-in battery.

The built-in battery low-voltage detection circuit is used for detecting a voltage of the built-in battery.

The microprocessor is used for implementing a low-voltage protection on the built-in battery voltage according to a detected voltage of the built-in battery.

Preferably, the electronic cigarette case further includes a charging indicator circuit connected to the microprocessor.

The charging indicator circuit is used for indicating a charging state of charging the built-in battery via the second charging voltage.

Preferably, the charging indicator circuit includes at least one first light-emitting diode for indicating that the built-in battery is charging or the built-in battery is full charged, or the built-in battery has a low voltage or the built-in battery is discharging, and at least one second light-emitting diode for indicating an electric energy grade of the built-in battery.

Preferably, the microprocessor has a model number of HT46R065.

Preferably, the boosting circuit includes a boosting chip, a first inductor, a first transistor, a first MOS tube and a first diode.

The boosting chip has a model number of CP2121.

Among them, a fourth pin of the boosting chip is connected to a sixth pin of the microprocessor, and a base of the first transistor via a first resistor. The base of the first transistor is also grounded via a second resistor (R9). The first transistor is further grounded via its emitter. A collector of the first transistor is connected to a gate of the first MOS tube, to a source of the first MOS tube via a third resistor, and to a positive plate of the built-in battery. A drain of the first MOS tube is connected to a sixth pin of the boosting chip, and to one terminal of the first inductor via a fourth resistor. Other terminal of the first inductor is connected to a first pin of the boosting chip and an anode of the first diode whose cathode is connected to the battery rod charging interface.

Preferably, the charging management and over-voltage protection circuit includes a charging management chip, a second diode, a second inductor and a second MOS tube.

The charging management chip has a model number of HB6293A.

A first pin of the charging management chip is connected to a twentieth pin of the microprocessor. A second pin of the charging management chip is connected to a nineteenth of the microprocessor. A third pin of the charging management chip is grounded via a first capacitor, and connected to a positive plate of an external power supply via a fifth resistor. A fourth pin of the charging management chip is connected to a grid of the second MOS tube. A seventh pin of the charging management chip is connected to a positive plate of the built-in battery. An eighth pin of the charging management chip is grounded via the second capacitor, and connected to one terminal of the second inductor. A VCC terminal of the external power supply is connected to an anode of the second diode via a fifth resistor. A cathode of the second diode is connected to a source of the second MOS tube, whose drain is connected to one terminal of the second inductor. Other terminal of the second inductor is connected to the eighth pin of the charging management chip and to the positive plate of the built-in battery via a sixth resistor.

Preferably, the built-in battery low-voltage detection circuit further includes a seventh resistor and an eighth resistor.

Among them, the seventh resistor is connected to a positive plate of the built-in battery via one terminal and connected to a second pin of the microprocessor and one terminal of the eighth resistor via other terminal. The eighth resistor is connected to a fifteenth pin of the microprocessor via other terminal.

Preferably, the Hall sensor module includes a Hall element, a third capacitor and a ninth resistor.

Among them, the Hall element is connected to a positive plate of the built-in battery via an inputting terminal, and to a first pin of the microprocessor via an outputting terminal, and is grounded via a Vss terminal. The outputting terminal of the Hall element is connected to the inputting terminal of the Hall element via a ninth resistor. The Vss terminal of the Hall element is connected to the inputting terminal of the Hall element via the third capacitor.

Preferably, the charging circuit further includes a charging management and over-voltage protection circuit, an over-current and full-charge detection circuit, and a boosting circuit.

The charging management and over-voltage protection circuit is connected to an external power supply, the microprocessor and the boosting circuit, respectively. The boosting circuit is connected to the microprocessor, the charging management and over-voltage protection circuit and the battery rod charging interface, respectively. The overcurrent and full-charge detection circuit is connected to the microprocessor and the battery rod charging interface, respectively.

The charging management and over-voltage protection circuit is used for providing a first charging voltage and implementing an overvoltage protection, when the external power supply is accessed.

The boosting circuit is used for adjusting the first charging voltage to charge the electronic cigarette battery rod.

The overcurrent and full-charge detection circuit is used for detecting a charging current during a charging process of the electronic cigarette battery rod.

The microprocessor is used for controlling a work state of the boosting circuit according to the charging current for adjusting the same.

The electronic cigarette case further includes a built-in battery. The charging circuit further includes a built-in battery protection circuit and a built-in battery low-voltage detection circuit.

The built-in battery is connected to the boosting circuit, the built-in battery protection circuit is connected to the built-in battery, and the built-in battery low-voltage detection circuit is connected to the microprocessor and the built-in battery, respectively.

The built-in battery is used for providing a second charging voltage which charges the electronic cigarette battery rod inserted into the battery rod charging interface, after being adjusted by the boosting circuit.

The built-in battery protection circuit is used for an over-current protection of the built-in battery.

The built-in battery low-voltage detection circuit is used for detecting a voltage of the built-in battery.

The microprocessor is used for implementing a low-voltage protection on the built-in battery voltage according to a detected voltage of the built-in battery.

The electronic cigarette case further includes a charging indicator circuit connected to the microprocessor.

The charging indicator circuit is used for indicating a charging state of charging the built-in battery via the second charging voltage.

The charging indicator circuit includes at least one first light-emitting diode for indicating that the built-in battery is charging or the built-in battery is full charged, or the built-in battery has a low voltage or the built-in battery is discharging, and at least one second light-emitting diode for indicating an electric energy grade of the built-in battery.

The microprocessor has a model number of HT46R065.

The boosting circuit includes a boosting chip, a first inductor, a first transistor, a first MOS tube and a first diode.

The boosting chip has a model number of CP2121.

Among them, a fourth pin of the boosting chip is connected to a sixth pin of the microprocessor, and a base of the first transistor via a first resistor. The base of the first transistor is also grounded via a second resistor (R9). The first transistor is further grounded via its emitter. A collector of the first transistor is connected to a gate of the first MOS tube, to a source of the first MOS tube via a third resistor, and to a positive plate of the built-in battery. A drain of the first MOS tube is connected to a sixth pin of the boosting chip, and to one terminal of the first inductor via a fourth resistor. Other terminal of the first inductor is connected to a first pin of the boosting chip and an anode of the first diode whose cathode is connected to the battery rod charging interface.

The charging management and over-voltage protection circuit includes a charging management chip, a second diode, a second inductor and a second MOS tube.

The charging management chip has a model number of HB6293A.

A first pin of the charging management chip is connected to a twentieth pin of the microprocessor. A second pin of the charging management chip is connected to a nineteenth of the microprocessor. A third pin of the charging management chip is grounded via a first capacitor, and connected to a positive plate of an external power supply via a fifth resistor. A fourth pin of the charging management chip is connected to a grid of the second MOS tube. A seventh pin of the charging management chip is connected to a positive plate of the built-in battery. An eighth pin of the charging management chip is grounded via the second capacitor, and connected to one terminal of the second inductor. A VCC terminal of the external power supply is connected to an anode of the second diode via a fifth resistor. A cathode of the second diode is connected to a source of the second MOS tube, whose drain is connected to one terminal of the second inductor. Other terminal of the second inductor is connected to the eighth pin of the charging management chip and to the positive plate of the built-in battery via a sixth resistor.

The built-in battery low-voltage detection circuit further includes a seventh resistor and an eighth resistor.

Among them, the seventh resistor is connected to a positive plate of the built-in battery via one terminal and connected to a second pin of the microprocessor and one terminal of the eighth resistor via other terminal. The eighth resistor is connected to a fifteenth pin of the microprocessor via other terminal.

The Hall sensor module includes a Hall element, a third capacitor and a ninth resistor.

Among them, the Hall element is connected to a positive plate of the built-in battery via an inputting terminal, and to a first pin of the microprocessor via an outputting terminal, and is grounded via a Vss terminal. The outputting terminal of the Hall element is connected to the inputting terminal of the Hall element via a ninth resistor. The Vss terminal of the Hall element is connected to the inputting terminal of the Hall element via the third capacitor.

According to a second aspect, a method for detecting insertion of a battery rod into or removal of the battery rod from an electronic cigarette case is provided, which comprising:

S1. arranging a Hall sensor module in the electronic cigarette case;

S2. detecting magnetic signals generated by inserting the battery rod into a battery rod charging interface or removing the battery rod from the battery rod charging interface by the Hall sensor module;

S3. outputting different level signals according to different magnetic signals by the Hall sensor module;

S4. controlling a charging circuit of the electronic cigarette case to switch on or off according to the level signals from the Hall sensor module, so as to charge the battery rod inserted into the battery rod charging interface or stop charging the battery rod removed from the battery rod charging interface by a microprocessor of the electronic cigarette case.

Preferably, if the battery rod is inserted into the battery rod charging interface, the magnetic signal is greater than a predetermined value, the level signal outputted from step S3 is a high level signal.

Preferably, if the battery rod is removed from the battery rod charging interface, the magnetic signal is smaller than a predetermined value, the level signal outputted from step S3 is a low level signal.

Preferably, if the battery rod is inserted into the battery rod charging interface, the magnetic signal is greater than a predetermined value, the level signal outputted from step S3 is a high level signal; and if the battery rod is removed from the battery rod charging interface, the magnetic signal is smaller than a predetermined value, the level signal outputted from step S3 is a low level signal.

When implementing the electronic cigarette case and method for detecting battery rod insertion into or removal from electronic cigarette case according to the present application, following advantageous or effects can be obtained. The insertion or removal of the battery rod can be identified accurately according to the change of magnetic field, so as to control the charging circuit to switch on or off, thus providing a new way of charging for the user. In such a way, the customer needs can be satisfied better and the user experience is improved. Moreover, the outputting voltage during the charging can be adjusted. Various working states or abnormal state of the charging can be indicated by LEDs, and the way of indication can be customized. In additional, the present application further has functions such as short-circuit protection, charging interface short-circuit protection during the charging, and circuit protection for built-in battery of the electronic cigarette case, and so on.

BRIEF DESCRIPTION OF THE DRAWINGS

The present application is further illustrated combining the embodiments of present application and the attached drawings.

DETAILED DESCRIPTION OF THE PREFERRED EMBODIMENT

Hereinafter, embodiments of the present application will be described in detail with reference to the accompanying drawings, such that a better understanding of the technical feature, object and effect of the present application can be obtained.

Figure 1:
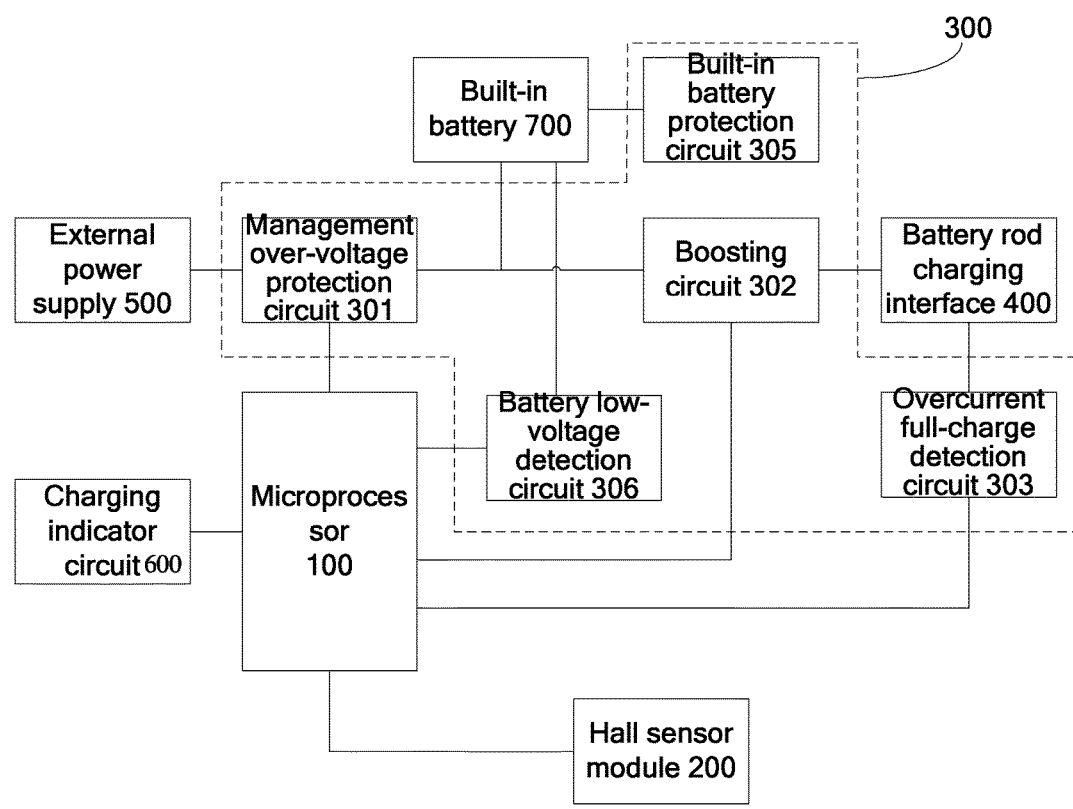
FIG. 1 is a structural diagram of the electronic cigarette case according to an embodiment of present application.

FIG. 1 is a structural diagram of the electronic cigarette case according to an embodiment of present application. The electronic cigarette case of the present application is used for storing electronic cigarettes (including electronic cigarette battery rod and/or electronic atomizer) and charging the electronic cigarette battery with a built-in magnet.

Referring FIG. 1, the electronic cigarette case according to the embodiment of present application includes a microprocessor 100, a Hall sensor module 200, a battery rod charging interface 400, and a charging circuit 300. The electronic cigarette case further includes a built-in battery 700 and a charging indicator circuit 600. The charging circuit 300 includes a charging management and over-voltage protection circuit 301, an overcurrent and full-charge detection circuit 303, and a boosting circuit 302. The charging circuit 300 further includes a built-in battery protection circuit 305 and a built-in battery low-voltage detection circuit 306.

Among them, the Hall sensor module 200 is connected to the microprocessor 100. The charging circuit 300 is connected to the microprocessor 100. The battery rod charging interface 400 is connected to the charging circuit 300. The charging management and over-voltage protection circuit 301 is connected to the external power supply 500, the microprocessor 100 and the boosting circuit 302, respectively. The boosting circuit 302 is connected to the microprocessor 100, the charging management and over-voltage protection circuit 301 and the battery rod charging interface 400, respectively. The overcurrent and full-charge detection circuit 303 is connected to the microprocessor 100 and the battery rod charging interface 400, respectively. The built-in battery 700 is connected to the boosting circuit 302, the built-in battery protection circuit 305 is connected to the built-in battery 700, and the built-in battery low-voltage detection circuit 306 is connected to the microprocessor 100 and the built-in battery 700, respectively. The charging indicator circuit 600 is connected to the microprocessor 100.

In the electronic cigarette case according to the embodiment of present application, the battery rod charging interface 400 is used for receiving the electronic cigarette battery rod having a built-in magnet.

The Hall sensor module 200 is used for detecting magnetic signals generated by inserting the electronic cigarette battery rod into the battery rod charging interface 400 or removing the electronic cigarette battery rod from the battery rod charging interface 400, and for outputting different level signals to the microprocessor 100 according to different magnetic signals.

The microprocessor 100 is used for controlling the charging circuit 300 to switch on or off according to the level signals from the Hall sensor module 200, so as to charge the electronic cigarette battery rod inserted into the battery rod charging interface 400 or stop charging the electronic cigarette battery rod removed from the battery rod charging interface 400.

The charging management and over-voltage protection circuit 301 is used for providing a first charging voltage and implementing an overvoltage protection, when the external power supply 500 is accessed.

The boosting circuit 302 is used for adjusting the first charging voltage to charge the electronic cigarette battery rod inserted into the battery rod charging interface 400.

The built-in battery 700 is used for providing a second charging voltage which charges the electronic cigarette battery rod inserted into the battery rod charging interface 400, after being adjusted by the boosting circuit 302.

The overcurrent and full-charge detection circuit 303 is used for detecting a charging current during a charging process by the first charging voltage or the second charging voltage. The microprocessor 100 is used for controlling a work state of the boosting circuit 302 according to the charging current for adjusting the same.

The built-in battery protection circuit 305 is used for an over-current protection of the built-in battery.

The built-in battery low-voltage detection circuit 306 is used for detecting a voltage of the built-in battery. The microprocessor 100 is used for implementing a low-voltage protection on the built-in battery voltage according to a detected voltage of the built-in battery.

In an embodiment of the present application, the external power supply 500 or the built-in battery 700 provide a charging voltage during the charging of the battery rod. Accordingly, the charging currents detected by the overcurrent and full-charge detection circuit 303 during the charging process can include two charging currents during the two different charging processes. Similarly, the charging indicator circuit 600 indicates the charging state via the charging voltage provided by the external power supply 500 or the built-in battery 700.

Figure 2:
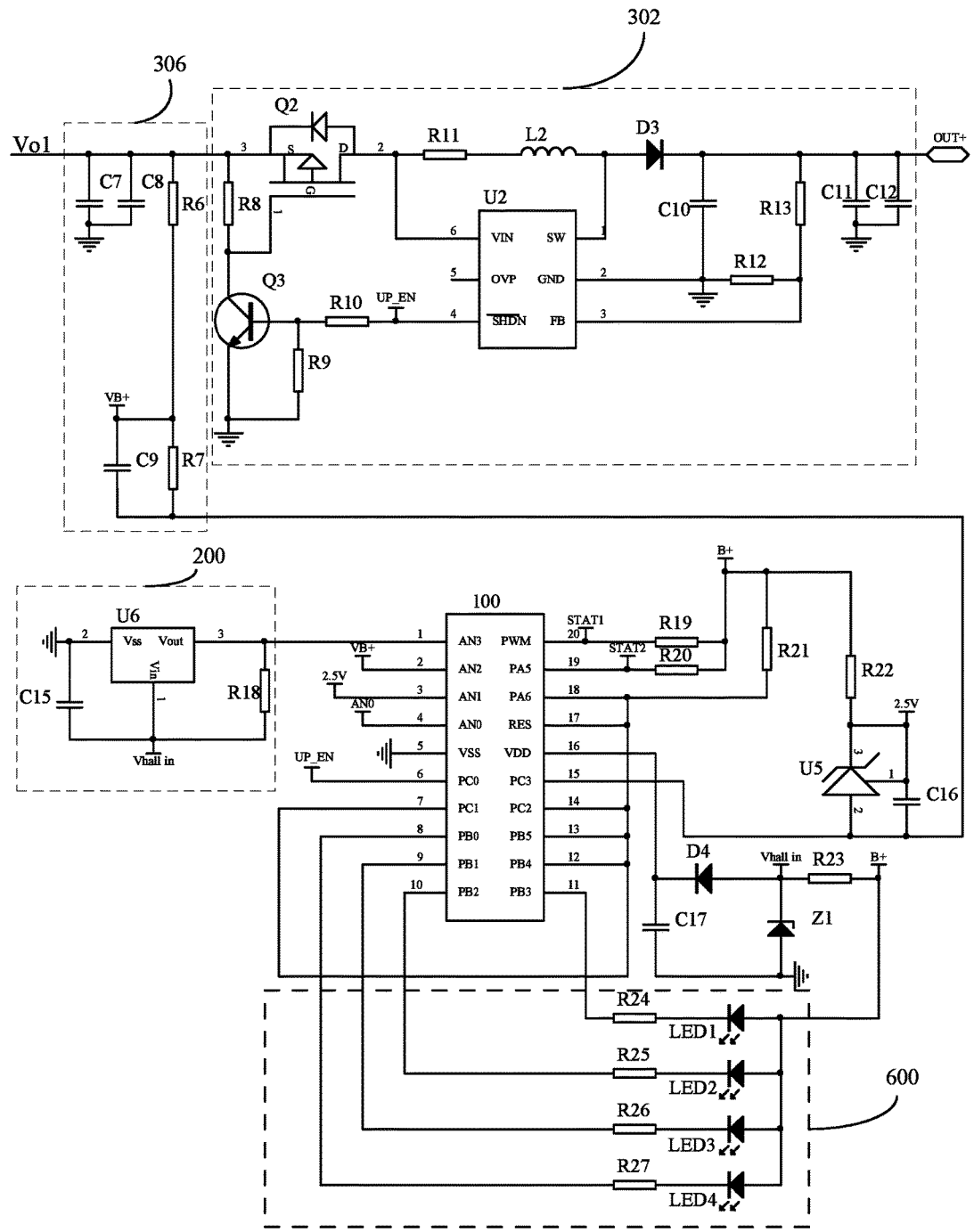
FIG. 2 is a circuit schematic diagram of the boosting circuit, the built-in battery low-voltage detection circuit, the Hall sensor module and the charging indicator circuit according to an embodiment of present application.
Figure 3:
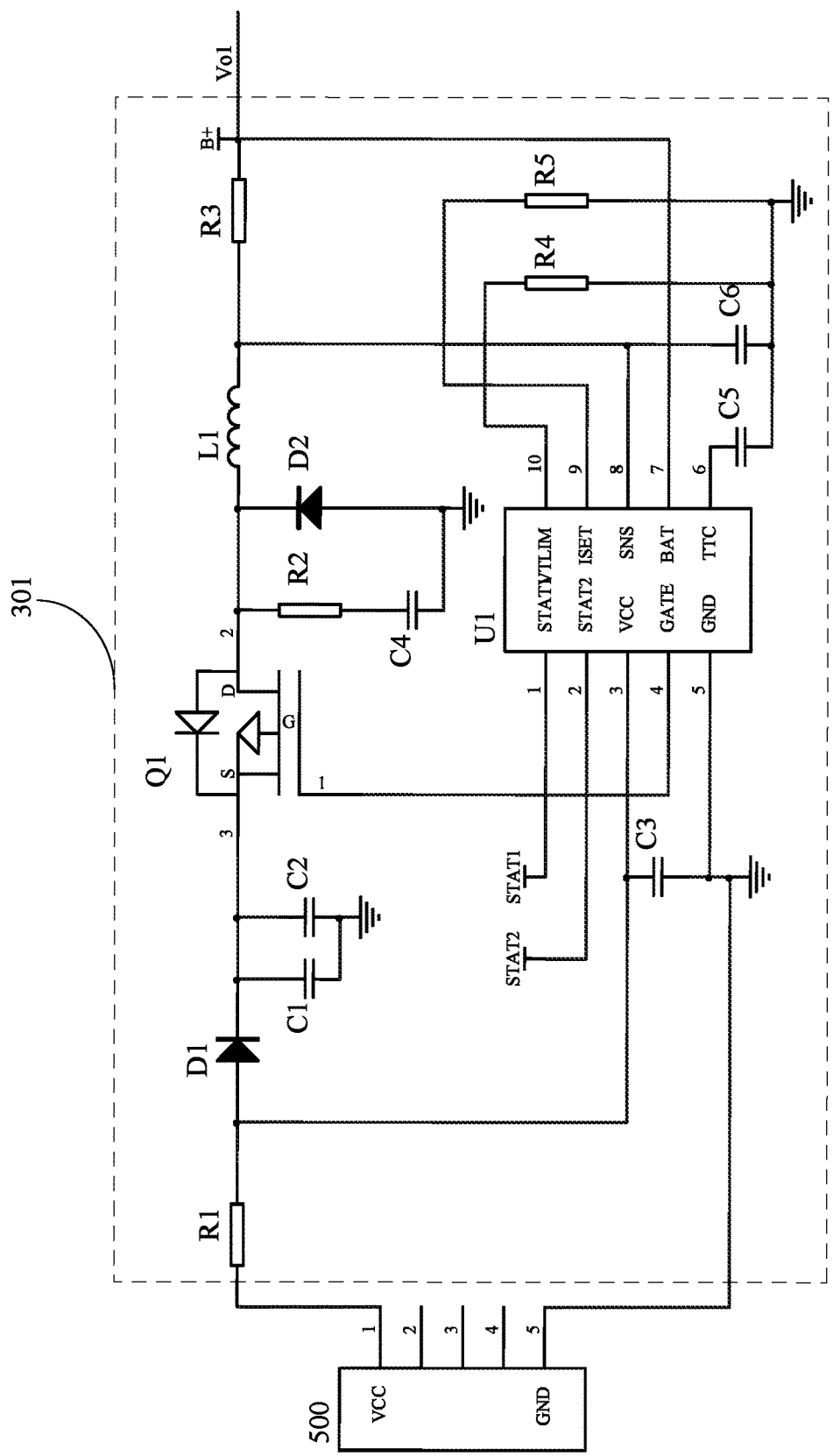
FIG. 3 is a circuit schematic diagram of the charging management and over-voltage protection circuit according to an embodiment of present application.
Figure 4:
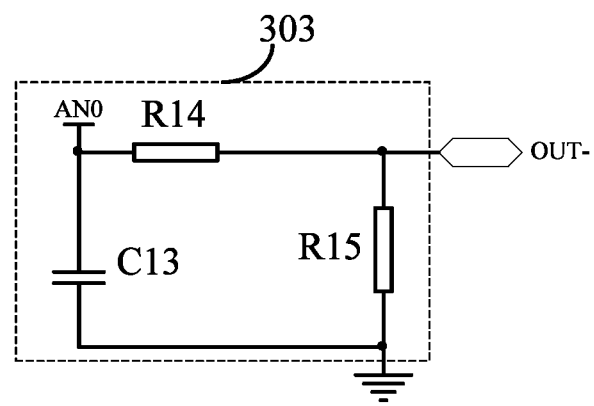
FIG. 4 is a circuit schematic diagram of the overcurrent and full-charge detection circuit according to an embodiment of present application.
Figure 5:
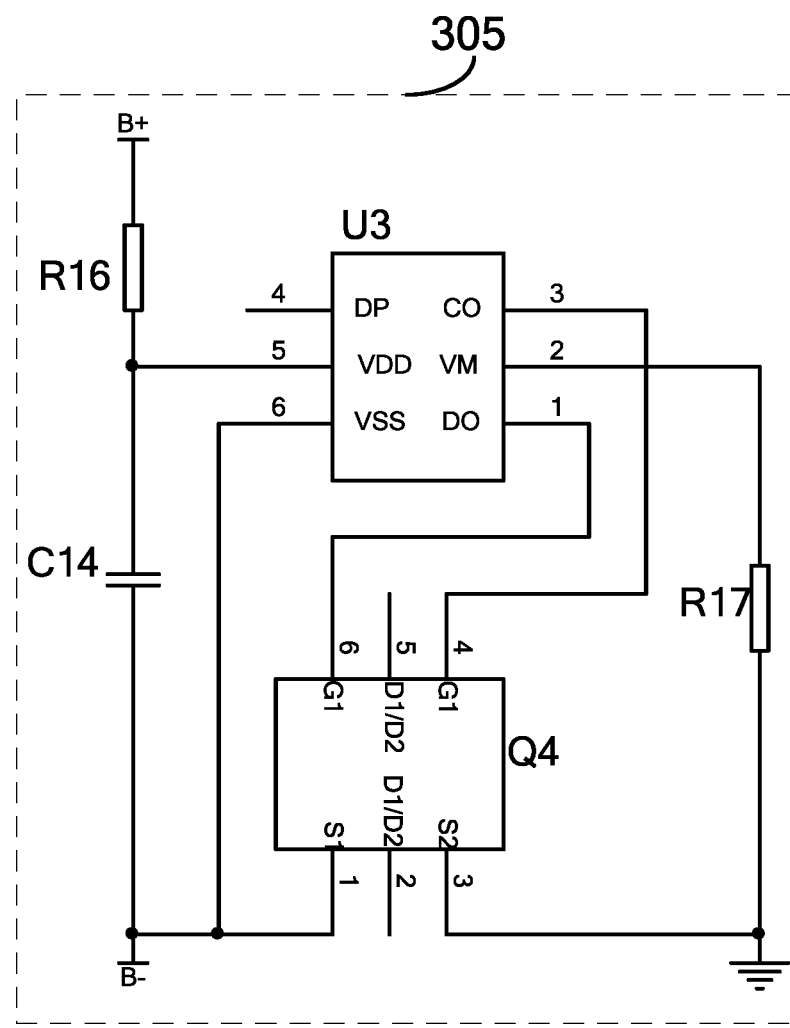
FIG. 5 is a circuit schematic diagram of the built-in battery protection circuit according to an embodiment of present application.

FIG. 2 is a circuit schematic diagram of the boosting circuit, the built-in battery low-voltage detection circuit, the Hall sensor module and the charging indicator circuit according to an embodiment of present application. FIG. 3 is a circuit schematic diagram of the charging management and over-voltage protection circuit according to an embodiment of present application. FIG. 4 is a circuit schematic diagram of the overcurrent and full-charge detection circuit according to an embodiment of present application. FIG. 5 is a circuit schematic diagram of the built-in battery protection circuit according to an embodiment of present application.

Referring FIGS. 2, 3, 4 and 5, in the embodiment of the present application, the B+ terminal and the B− terminal are the positive plate and negative plate of the built-in battery 700, respectively 700. The OUT+ terminal and the OUT− terminal are two opposite terminals of the battery rod charging interface 400.

Referring FIGS. 2, 3, 4 and 5, in the embodiment of the present application, the charging management and over-voltage protection circuit 301 includes a charging management chip U1, a second diode D1, a second inductor L1 and a second MOS tube Q1. The charging management chip U1 has a model number of HB6293A. The microprocessor 100 has a model number of HT46R065. The Hall sensor module 200 includes a Hall element U6, a third capacitor C15 and a ninth resistor R18. The boosting circuit 302 includes a boosting chip U2, a first transistor Q3, and a first MOS tube Q2. The boosting chip U2 has a model number of CP2121. The built-in battery low-voltage detection circuit 306 further includes a seventh voltage-dividing resistor R6 and an eighth voltage-dividing resistor R7. The charging indicator circuit 600 includes light-emitting diode LED1, light-emitting diode LED2, light-emitting diode LED3, and light-emitting diode LED4. The overcurrent and full-charge detection circuit 303 includes resistor R14, resistor R15 and capacitor C13. The built-in battery protection circuit 305 includes a battery protection chip U3 and a switch chip Q4 including an integrated N-MOS tube and an on/off MOS tube.

Referring FIG. 2, in the Hall sensor module 200, the Hall element U6 is connected to the anode of the diode D4 and the cathode of the zener diode via an inputting terminal. The inputting terminal of the Hall element U6 is further connected to the positive plate of the built-in battery 700. The cathode of the diode D4 is connected to the VDD pin of the microprocessor and the positive plate of the capacitor C17. The anode of the zener diode Z1 is grounded and is further connected to the negative plate of the capacitor C17. The outputting terminal of the Hall element U6 is connected to the first pin of the microprocessor 100 and the inputting terminal of the Hall element U6 via a ninth resistor R18. The Vss terminal of the Hall element U6 is grounded and further connected to the inputting terminal of the Hall element U6 via the third capacitor C15.

In the embodiment of the present application, the Hall element U6 is arranged near the battery rod charging interface 400, so as to sense magnetic signals generated by inserting the battery rod into the electronic cigarette case or removing the battery rod from the electronic cigarette case. The Hall element U6 has an input voltage at its inputting terminal. The input voltage is a work voltage when the Hall element U6 works normally and is close to the voltage of the built-in battery 700 in the electronic cigarette case.

To be specific, when the electronic cigarette battery rod is inserted into the battery rod charging interface 400, the Hall element U6 detects magnetic signals going through it for obtaining the magnetic field strength. When the obtained magnetic field strength is greater than a predetermined value (such as B), the Hall element U6 outputs a high level signal to the microprocessor 100 from the outputting terminal. The microprocessor 100 controls its sixth pin (i.e. PC0 pin) to output a high level, such that the first transistor Q3 and the first MOS tube Q2 in the boosting circuit 302 are switched on for charging the electronic cigarette battery rod.

When electronic cigarette battery rod is removed from the battery rod charging interface 400, the Hall element U6 detects that the obtained magnetic field strength is smaller than a predetermined value (such as B), then the Hall element U6 outputs a low level signal to the microprocessor 100 from the outputting terminal. The microprocessor 100 controls its sixth pin (i.e. PC0 pin) to output a low level, such that the first transistor Q3 and the first MOS tube Q2 in the boosting circuit 302 are switched off for stopping charging the electronic cigarette battery rod. In such a way, the electronic cigarette case of the present embodiment can sense the insertion and removal of the electronic cigarette battery rod via the Hall sensor module 200, so as to detect the charging insertion and charging removal of the electronic cigarette battery rod, and thus starting or ending the charging.

Referring FIG. 2, in the boosting circuit 302, the boosting chip U2 has a first pin of SW pin, a second pin of GND pin, a third pin of FB pin, and a fourth pin of $\overline{SHDN}$ pin, a fifth pin of OVP pin, and a sixth pin of VIN pin. The $\overline{SHDN}$ pin is connected to the sixth pin of the microprocessor 100, and the base of the first transistor Q3 via the first resistor R10. The base of the transistor Q3 is grounded via the second resistor (R9) R9, and the emitter of the transistor Q3 is grounded too. The collector of the transistor Q3 is connected to the gate of the first MOS tube Q2, and to the source of the first MOS tube Q2 via the third resistor R8, and to the positive plate of the built-in battery 700 (that is, B+ terminal). The drain of the first MOS tube Q2 is connected to the VIN pin of the boosting chip U2, to one terminal of the first inductor L2 via the fourth resistor R11. The other terminal of the first inductor L2 is connected to the SW pin of the boosting chip U2 and the anode of the first diode D3 whose cathode is connected to the positive plate of the capacitor C10, and the OUT+ terminal. One terminal of the resistor R13 is connected to the cathode of the first diode D3 and the OUT+ terminal, the other terminal of the resistor R13 is connected to the FB pin of the boosting chip U2 and one terminal of the resistor R12 whose other terminal is grounded. The negative plate of the capacitor C10 is grounded. The boosting chip U2 is grounded via the GND pin. The capacitor C11 is grounded via its negative plate, and connected to the cathode of the first diode D3 and the OUT+ terminal via its positive plate. The capacitor C12 is grounded via its negative plate, and connected to the cathode of the first diode D3 and the OUT+ terminal via its positive plate.

When the microprocessor 100 outputs a high level from the sixth pin, the first transistor Q3 and the first MOS tube Q2 are switched on, and the $\overline{SHDN}$ pin of the boosting chip U2 has a high level. Then the boosting chip U2 starts working for boosting the charging voltage and charging the battery rod inserted into the battery rod charging interface 400 via the boosted charging voltage. When the microprocessor 100 outputs a low level from the sixth pin, the first transistor Q3 and the first MOS tube Q2 are switched off, and the $\overline{SHDN}$ pin of the boosting chip U2 has a low level. Then the boosting chip U2 stops working (that is, being turned off) for stopping the charging.

In the embodiment of the present application, when the microprocessor 100 outputs a high level from the sixth pin (that is, PC0 pin), the $\overline{SHDN}$ pin of the boosting chip U2 in the boosting circuit 302 has an low level input, then the boosting chip U2 would be turned off for saving electrical power.

Referring FIG. 2, in the built-in battery low-voltage detection circuit 306 according to the present application, one terminal of the seventh resistor R6 is connected to the positive plate of the built-in battery 700, and the other terminal is connected to the eighth pin of the microprocessor 100 and one terminal of the voltage-dividing resistor R7 whose other terminal is connected to the fifth pin of the microprocessor 100. The capacitor C9 is connected to the second pin of the microprocessor 100 via its positive plate, and to one terminal of the eighth resistor R7 and the fifth pin of the microprocessor 100 via its negative plate. The capacitor C7 is connected to the positive plate of the built-in battery 700 via its positive plate, and is grounded via its negative plate. The capacitor C8 is connected to the positive plate of the built-in battery 700 via its positive plate, and is grounded via its negative plate. The built-in battery low-voltage detection circuit 306 according to the present application can provide a detection function for the calculation of the battery level and the low-voltage protection of the built-in battery 700.

Referring FIG. 2, the charging indicator circuit 600 includes at least one first light-emitting diode for indicating that the built-in battery 700 is charging or the built-in battery 700 is full charged, or the built-in battery 700 has a low voltage or the built-in battery 700 is discharging, and at least one second light-emitting diode for indicating an electric energy grade of the built-in battery 700.

Preferably, in an embodiment of the present application, the charging indicator circuit 600 includes one first light emitting diode LED1 which is red light emitting diode, three second light emitting diodes LED2~LED4 which are blue light emitting diodes. The cathodes of the light emitting diodes LED1~LED4 are corresponding connected to the PB11, P10, P9 and P8 pins of the microprocessor 100, respectively via resistor R24~R27. The anode of the light emitting diodes LED1~LED4 are corresponding connected to the positive plate of the built-in battery 700.

To be specific, when the first light emitting diode LED1 is used for indicating a signal representing charging the battery, it flickers in a high frequency whose range is greater than 4, preferably 5 in the present embodiment, namely it flickers five times in each second. When the first light emitting diode LED1 is used for indicating a signal representing that the battery is full charged, it lights all the time rather than flickers. When the first light emitting diode LED1 is used for indicating a signal representing that the battery has a low voltage, it flickers in a low frequency whose range is smaller than 0.5, preferably 0.5 in the present embodiment, namely it flickers once in each two seconds. When the first light emitting diode LED1 is used for indicating a signal representing discharging the battery, it flickers in a low frequency and its brightness is waning during each flicker. The second light emitting diodes LED2~LED4, light corresponding number based on the corresponding power level of the charging voltage. For example, in the present application, when the power level corresponding to the battery voltage reaches 30%, one second light emitting diode LED2 is lighted, and when the power level corresponding to the battery voltage reaches 60%, two second light emitting diode LED2 and LED3 are lighted at the same time, and so on. Thus, the charging indicator circuit 600 provides LED indication for a variety of working state and abnormal state, and the display mode can be set.

See FIG. 2, the eighteenth pin of the microprocessor is connected to the positive plate of the built-in battery 700 via the resistor R21. The fifteenth of the microprocessor 100 is connected to the anode of the three terminal adjustable shunt reference source U5 and the negative plate of the capacitor C16. The cathode of the three terminal adjustable shunt reference source U5 is connected to the positive plate of the built-in battery 700 via the resistor R21 and the third pin of the microprocessor 100. The reference terminal of the three terminal adjustable shunt reference source U5 is connected to the positive plate of the capacitor C16 and the third pin of the microprocessor 100. Accordingly, a reference voltage of 2.5V can be provided to the microprocessor 100.

Referring FIG. 3, in the charging management and overvoltage protection circuit 301 according the embodiment of the present application, the first pin of the charging management chip U1 is connected to the twentieth pin of the microprocessor 100. The second pin of the charging management chip U1 is connected to the nineteenth of the microprocessor 100. The third pin of the charging management chip U1 is grounded via the first capacitor C3, and connected to the positive plate of the external power supply 500 (that is VCC terminal in FIG. 2) via the fifth resistor R1. The fourth pin of the charging management chip U1 is connected to the grid of the second MOS tube Q1. The sixth pin of the charging management chip U1 is grounded via the capacitor C5. The seventh pin of the charging management chip U1 is connected to the positive plate of the built-in battery 700 (that is B+ terminal in FIG. 2). The eighth pin of the charging management chip U1 is grounded via the second capacitor C6, and connected to one terminal of the second inductor L1. The ninth pin of the charging management chip U1 is grounded via the resistor R5. The tenth pin of the charging management chip U1 is grounded via the resistor R4. The VCC terminal of the external power supply 500 is connected to the anode of the second diode D1 via the fifth resistor R1. The cathode of the second diode D1 is grounded via the capacitor C1 and capacitor C2, respectively. The cathode of the second diode D1 is further connected to the source of the second MOS tube Q1, whose drain is connected to one terminal of the second inductor L1 and the cathode of the diode D2, and is further grounded via the resistor R2 and capacitor C4 connected in series. Other terminal of the second inductor L1 is connected to the eighth pin of the charging management chip U1 and to the positive plate of the built-in battery 700 via the sixth resistor R3.

The second diode D1 is used to prevent the reverse connection of the external power supply 500. The charging management chip U1 can control the conduction and cut-off of the second MOS tube Q1 by controlling the output voltage of the fourth pin, so as to realize the overvoltage protection and charging management functions. The first pin and the second pin of the charge management chip U1 are respectively used for sending the signals representing that the built-in battery 700 is full charged or is charging to the microprocessor 100 to realize the charging management.

In the embodiment of the present application, the microprocessor 100 controls the LEDs in the charging indicator circuit 600 bases on signals from the nineteenth pin connected to the charging management chip U1 for receiving a signal representing that the built-in battery 700 is full charged and from the twentieth pin connected to the charging management chip U1 for receiving a signal representing that the built-in battery 700 is charging.

Referring FIG. 3, in the overcurrent and full-charge detection circuit 303 according the embodiment of the present application, the resistor R15 is grounded via one terminal, and connected to OUT− terminal and to the AN0 pin of the microprocessor 100 via the resistor R14. The positive plate of the capacitor C13 is connected to the AN0 pin of the microprocessor 100 and one terminal of the resistor R14.

If the charge current of the battery pole is too large, the current flowing through the resistor R14 is very large too, that is, the microprocessor 100 would detect a very large current at its AN0 pin. The microprocessor 100 controls the boosting circuit 302 via controlling the output voltage of its sixth pin, so as to reduce the charging voltage for the battery pole, thus ensuring that the charge current of the battery pole would not be too large. If the battery pole is full charged, the current flowing through the resistor R14 is too small, then the microprocessor 100 controls the boosting circuit 302 via controlling the output voltage of its sixth pin, so as to stop charging the battery pole.

Referring FIG. 5, in the built-in battery protection circuit 305 according the embodiment of the present application, one terminal of the resistor R16 is connected to the positive plate of the built-in battery 700, and the other terminal of the resistor R16 is connected to the filter capacitor C14 in series and then connected to the negative plate of the built-in battery 700. The resistor R16 is connected to the VM pin of the battery protection chip U3 and the S2 pin of the switching chip Q4 for preventing the current reverse. The battery protection chip U3 is used for controlling the switching on and off of the switching on/off MOS tube based on the current flowing through the integrated N-MOS tube, and the n further controlling the built-in battery 700 in the cigarette case to work or not. Accordingly, the built-in battery protection circuit 305 according the embodiment of the present application, provides circuit protection functions, especially an output, input over-current, short circuit protection and so on of the built-in battery 700. Meanwhile, the battery protection chip U3 also can prevent overcharge, overdischarge protections of the built-in battery.

Figure 6:
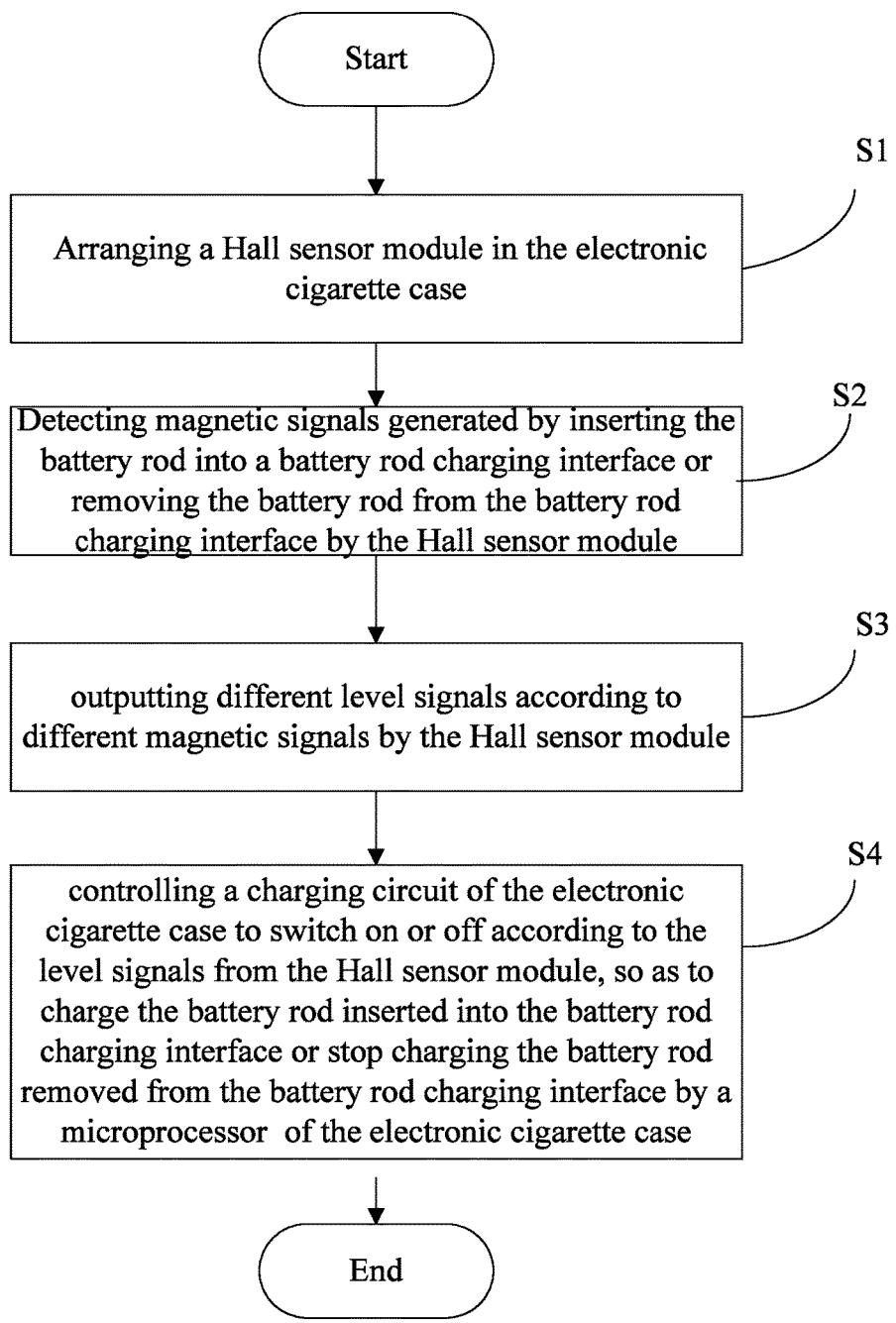
FIG. 6 is a flow diagram of method for detecting insertion of a battery rod into or removal of the battery rod from an electronic cigarette case according to an embodiment of present application.

Referring FIG. 6, a method for detecting insertion of a battery rod into or removal of the battery rod from an electronic cigarette case is provided, which comprising following steps.

S1, a Hall sensor module is arranged in the electronic cigarette case.

To be specific, the Hall sensor module can be a Hall element.

S2, the Hall sensor module detects magnetic signals generated by inserting the battery rod into a battery rod charging interface or removing the battery rod from the battery rod charging interface.

To be specific, the method for detecting insertion of a battery rod into or removal of the battery rod from an electronic cigarette case is used for detection of insertion and removal of a battery rod from a cigarette case. The cigarette case has a battery rod charging interface is used for receiving the electronic cigarette battery rod having a built-in magnet.

S3, the Hall sensor module outputs different level signals according to different magnetic signals.

To be specific, if the battery rod is inserted into the battery rod charging interface, the magnetic signal is greater than a predetermined value, the level signal outputted from step S3 is a high level signal. If the battery rod is removed from the battery rod charging interface, the magnetic signal is smaller than a predetermined value, the level signal outputted from step S3 is a low level signal.

S4, the microprocessor of the electronic cigarette case controls a charging circuit of the electronic cigarette case to switch on or off according to the level signals from the Hall sensor module, so as to charge the battery rod inserted into the battery rod charging interface or stop charging the battery rod removed from the battery rod charging interface.

It should be noted that, the method for detecting insertion of a battery rod into or removal of the battery rod from an electronic cigarette case is corresponding to the above electronic cigarette case. When implementing the electronic cigarette case of the present application for charging the electronic cigarette battery rod having a built-in magnet, or the detecting method for detecting insertion and removal of a battery rod from a cigarette case, the Hall sensor module can accurately identify the insertion or removal of the battery rod according to the change of magnetic field, so as to control the charging circuit to switch on or off.

When implementing the electronic cigarette case and method for detecting battery rod insertion into or removal from electronic cigarette case according to the present application, a new way of charging for the user is provided. In such a way, the customer needs can be satisfied better and the user experience is improved. Moreover, the outputting voltage during the charging can be adjusted. Various working states or abnormal state of the charging can be indicated by LEDs, and the way of indication can be customized. In additional, the present application further has functions such as short-circuit protection, charging interface short-circuit protection during the charging, and circuit protection for built-in battery of the electronic cigarette case, and so on.

It should be understood, in the embodiments of the present application, the chip (the microprocessor, boosting chip, charging management chip, battery protection chip and switch chip) can have different model numbers, and the circuit connection relationship can be adjusted according to the type of chip to achieve the same function.

The foregoing description of the embodiment of the present application has been presented for purpose of illustration and description. It is intended to illustrate the present application rather than limit the application to the precise form disclosed. It should be understood that various changes, substitutions and alterations can be made hereto by one skilled in the art based on the motivation of the present application, without departing from the spirit and scope of the present application as described by the appended claims.

What is claimed is:

1. An electronic cigarette case for charging an electronic cigarette battery rod, including a microprocessor (100), a Hall sensor module (200), a battery rod charging interface (400), and a charging circuit (300); wherein the Hall sensor module (200) is connected to the microprocessor (100), the charging circuit (300) is connected to the microprocessor (100), the battery rod charging interface (400) is connected to the charging circuit (300);

the battery rod charging interface (400) is used for receiving the electronic cigarette battery rod having a built-in magnet; wherein the Hall sensor module (200) is used for detecting magnetic signals generated by inserting the electronic cigarette battery rod into the battery rod charging interface (400) or removing the electronic cigarette battery rod from the battery rod charging interface (400), and for outputting different level signals to the microprocessor (100) according to different magnetic signals;

the microprocessor (100) is used for controlling the charging circuit (300) to switch on or off according to the level signals from the Hall sensor module (200), so as to charge the electronic cigarette battery rod inserted into the battery rod charging interface (400) or stop charging the electronic cigarette battery rod removed from the battery rod charging interface (400);

wherein the charging circuit (300) further includes:

a charging management and over-voltage protection circuit (301), an overcurrent and full-charge detection circuit (303), and a boosting circuit (302); wherein the charging management and over-voltage protection circuit (301) is connected to an external power supply (500), the microprocessor (100) and the boosting circuit (302), respectively; the boosting circuit (302) is connected to the microprocessor (100), the charging management and over-voltage protection circuit (301) and the battery rod charging interface (400), respectively; the overcurrent and full-charge detection circuit (303) is connected to the microprocessor (100) and the battery rod charging interface (400), respectively; wherein the charging management and over-voltage protection circuit (301) is used for providing a first charging voltage and implementing an overvoltage protection, when the external power supply (500) is accessed;

the boosting circuit (302) is used for adjusting the first charging voltage to charge the electronic cigarette battery rod;

the overcurrent and full-charge detection circuit (303) is used for detecting a charging current during a charging process of the electronic cigarette battery rod;

the microprocessor (100) is used for controlling a work state of the boosting circuit (302) according to the charging current for adjusting the same;

wherein the electronic cigarette case further includes a built-in battery (700), the charging circuit (300) further includes a built-in battery protection circuit (305) and a built-in battery low-voltage detection circuit (306); wherein the built-in battery (700) is connected to the boosting circuit (302), the built-in battery protection circuit (305) is connected to the built-in battery (700), and the built-in battery low-voltage detection circuit (306) is connected to the microprocessor (100) and the built-in battery (700), respectively; wherein the built-in battery (700) is used for providing a second charging voltage which charges the electronic cigarette battery rod inserted into the battery rod charging interface (400), after being adjusted by the boosting circuit (302);

the built-in battery protection circuit (305) is used for an over-current protection of the built-in battery;

the built-in battery low-voltage detection circuit (306) is used for detecting a voltage of the built-in battery;

the microprocessor (100) is used for implementing a low-voltage protection on the built-in battery voltage according to a detected voltage of the built-in battery; and wherein the microprocessor (100) has a model number of HT46R065.

2. The electronic cigarette case according to claim 1, wherein, the electronic cigarette case further includes a charging indicator circuit (600) connected to the microprocessor (100); wherein the charging indicator circuit (600) is used for indicating a charging state of charging the built-in battery (700) via the second charging voltage.

3. The electronic cigarette case according to claim 2, wherein, the charging indicator circuit (600) includes at least one first light-emitting diode for indicating that the built-in battery (700) is charging or the built-in battery (700) is full charged, or the built-in battery (700) has a low voltage or the built-in battery (700) is discharging, and at least one second light-emitting diode for indicating an electric energy grade of the built-in battery (700).

4. The electronic cigarette case according to claim 1, wherein, the boosting circuit (302) includes a boosting chip (U2), a first inductor (L2), a first transistor (Q3), a first MOS tube (Q2) and a first diode (D3);

the boosting chip (U2) has a model number of CP2121;

wherein, a fourth pin of the boosting chip (U2) is connected to a sixth pin of the microprocessor (100), and a base of the first transistor (Q3) via a first resistor (R10), the base of the first transistor (Q3) is also grounded via a second resistor (R9), the first transistor (Q3) is further grounded via its emitter, a collector of the first transistor (Q3) is connected to a gate of the first MOS tube (Q2), to a source of the first MOS tube (Q2) via a third resistor (R8), and to a positive plate of the built-in battery (700), a drain of the first MOS tube (Q2) is connected to a sixth pin of the boosting chip (U2), and to one terminal of the first inductor (L2) via a fourth resistor (R11), other terminal of the first inductor (L2) is connected to a first pin of the boosting chip (U2) and an anode of the first diode (D3) whose cathode is connected to the battery rod charging interface (400).

5. The electronic cigarette case according to claim 4, wherein, the Hall sensor module (200) includes a Hall element (U6), a third capacitor (C15) and a ninth resistor (R18); wherein, the Hall element (U6) is connected to a positive plate of the built-in battery (700) via an inputting terminal, and to a first pin of the microprocessor (100) via an outputting terminal, and is grounded via a Vss terminal, the outputting terminal of the Hall element (U6) is connected to the inputting terminal of the Hall element (U6) via the ninth resistor (R18), the Vss terminal of the Hall element (U6) is connected to the inputting terminal of the Hall element (U6) via the third capacitor (C15).

6. The electronic cigarette case according to claim 1, wherein, the charging management and over-voltage protection circuit (301) includes a charging management chip (U1), a second diode (D2), a second inductor (L1) and a second MOS tube (Q1);

the charging management chip (U1) has a model number of HB6293A; wherein a first pin of the charging management chip (U1) is connected to a twentieth pin of the microprocessor (100), a second pin of the charging management chip (U1) is connected to a nineteenth of the microprocessor (100), a third pin of the charging management chip (U1) is grounded via a first capacitor (C3), and connected to a positive plate of an external power supply (500) via a fifth resistor (R1), a fourth pin of the charging management chip (U1) is connected to a grid of the second MOS tube (Q1), a seventh pin of the charging management chip (U1) is connected to a positive plate of the built-in battery (700), an eighth pin of the charging management chip (U1) is grounded via the second capacitor (C6), and connected to one terminal of the second inductor (L1), a VCC terminal of the external power supply (500) is connected to an anode of the second diode (D2) via the fifth resistor (R1), the cathode of the second diode (D2) is connected to a source of the second MOS tube (Q1), whose drain is connected to one terminal of the second inductor (L1), other terminal of the second inductor (L1) is connected to the eighth pin of the charging management chip (U1) and to the positive plate of the built-in battery (700) via a sixth resistor (R3).

7. The electronic cigarette case according to claim 6, wherein, the Hall sensor module (200) includes a Hall element (U6), a third capacitor (C15) and a ninth resistor (R18); wherein, the Hall element (U6) is connected to a positive plate of the built-in battery (700) via an inputting terminal, and to a first pin of the microprocessor (100) via an outputting terminal, and is grounded via a Vss terminal, the outputting terminal of the Hall element (U6) is connected to the inputting terminal of the Hall element (U6) via the ninth resistor (R18), the Vss terminal of the Hall element (U6) is connected to the inputting terminal of the Hall element (U6) via the third capacitor (C15).

8. The electronic cigarette case according to claim 1, wherein, the built-in battery low-voltage detection circuit (306) further includes a seventh resistor (R6) and an eighth resistor (R7); wherein, the seventh resistor (R6) is connected to a positive plate of the built-in battery (700) via one terminal and connected to a second pin of the microprocessor (100) and one terminal of the eighth resistor (R7) via other terminal, the eighth resistor (R7) is connected to a fifteenth pin of the microprocessor (100) via other terminal.

9. The electronic cigarette case according to claim 8, wherein, the Hall sensor module (200) includes a Hall element (U6), a third capacitor (C15) and a ninth resistor (R18); wherein, the Hall element (U6) is connected to a positive plate of the built-in battery (700) via an inputting terminal, and to a first pin of the microprocessor (100) via an outputting terminal, and is grounded via a Vss terminal, the outputting terminal of the Hall element (U6) is connected to the inputting terminal of the Hall element (U6) via the ninth resistor (R18), the Vss terminal of the Hall element (U6) is connected to the inputting terminal of the Hall element (U6) via the third capacitor (C15).

10. A method for detecting insertion of a battery rod into or removal of the battery rod from an electronic cigarette case according to claim 1 comprising:

S1. arranging a Hall sensor module in the electronic cigarette case;

S2. detecting magnetic signals generated by inserting the battery rod into a battery rod charging interface or removing the battery rod from the battery rod charging interface by the Hall sensor module;

S3. outputting different level signals according to different magnetic signals by the Hall sensor module;

S4. controlling a charging circuit of the electronic cigarette case to switch on or off according to the level signals from the Hall sensor module, so as to charge the battery rod inserted into the battery rod charging interface or stop charging the battery rod removed from the battery rod charging interface by a microprocessor (100) of the electronic cigarette case.

11. The method for detecting insertion of a battery rod into or removal of the battery rod from an electronic cigarette case according to claim 10, wherein if the battery rod is inserted into the battery rod charging interface, the magnetic signal is greater than a predetermined value, the level signal outputted from step S3 is a high level signal.

12. The method for detecting insertion of a battery rod into or removal of the battery rod from an electronic cigarette case according to claim 10, wherein if the battery rod is removed from the battery rod charging interface, the magnetic signal is smaller than a predetermined value, the level signal outputted from step S3 is a low level signal.

13. The method for detecting insertion of a battery rod into or removal of the battery rod from an electronic cigarette case according to claim 10, wherein if the battery rod is inserted into the battery rod charging interface, the magnetic signal is greater than a predetermined value, the level signal outputted from step S3 is a high level signal; and
if the battery rod is removed from the battery rod charging interface, the magnetic signal is smaller than a predetermined value, the level signal outputted from step S3 is a low level signal.

14. An electronic cigarette case for charging an electronic cigarette battery rod, including a microprocessor (100), a Hall sensor module (200), a battery rod charging interface (400), and a charging circuit (300); wherein
the Hall sensor module (200) is connected to the microprocessor (100), the charging circuit (300) is connected to the microprocessor (100), the battery rod charging interface (400) is connected to the charging circuit (300);
the battery rod charging interface (400) is used for receiving the electronic cigarette battery rod having a built-in magnet; wherein
the Hall sensor module (200) is used for detecting magnetic signals generated by inserting the electronic cigarette battery rod into the battery rod charging interface (400) or removing the electronic cigarette battery rod from the battery rod charging interface (400), and for outputting different level signals to the microprocessor (100) according to different magnetic signals;
the microprocessor (100) is used for controlling the charging circuit (300) to switch on or off according to the level signals from the Hall sensor module (200), so as to charge the electronic cigarette battery rod inserted into the battery rod charging interface (400) or stop charging the electronic cigarette battery rod removed from the battery rod charging interface (400);
wherein the charging circuit (300) further includes:
a charging management and over-voltage protection circuit (301), an overcurrent and full-charge detection circuit (303), and a boosting circuit (302); wherein
the charging management and over-voltage protection circuit (301) is connected to an external power supply (500), the microprocessor (100) and the boosting circuit (302), respectively; the boosting circuit (302) is connected to the microprocessor (100), the charging management and over-voltage protection circuit (301) and the battery rod charging interface (400), respectively; the overcurrent and full-charge detection circuit (303) is connected to the microprocessor (100) and the battery rod charging interface (400), respectively; wherein
the charging management and over-voltage protection circuit (301) is used for providing a first charging voltage and implementing an overvoltage protection, when the external power supply (500) is accessed;
the boosting circuit (302) is used for adjusting the first charging voltage to charge the electronic cigarette battery rod;
the overcurrent and full-charge detection circuit (303) is used for detecting a charging current during a charging process of the electronic cigarette battery rod;
the microprocessor (100) is used for controlling a work state of the boosting circuit (302) according to the charging current for adjusting the same; wherein
the electronic cigarette case further includes a built-in battery (700), the charging circuit (300) further includes a built-in battery protection circuit (305) and a built-in battery low-voltage detection circuit (306); wherein
the built-in battery (700) is connected to the boosting circuit (302), the built-in battery protection circuit (305) is connected to the built-in battery (700), and the built-in battery low-voltage detection circuit (306) is connected to the microprocessor (100) and the built-in battery (700), respectively; wherein
the built-in battery (700) is used for providing a second charging voltage which charges the electronic cigarette battery rod inserted into the battery rod charging interface (400), after being adjusted by the boosting circuit (302);
the built-in battery protection circuit (305) is used for an over-current protection of the built-in battery;
the built-in battery low-voltage detection circuit (306) is used for detecting a voltage of the built-in battery;
the microprocessor (100) is used for implementing a low-voltage protection on the built-in battery voltage according to a detected voltage of the built-in battery; wherein,
the electronic cigarette case further includes a charging indicator circuit (600) connected to the microprocessor (100); wherein
the charging indicator circuit (600) is used for indicating a charging state of charging the built-in battery (700) via the second charging voltage; wherein, the charging indicator circuit (600) includes at least one first light-emitting diode for indicating that the built-in battery (700) is charging or the built-in battery (700) is full charged, or the built-in battery (700) has a low voltage or the built-in battery (700) is discharging, and at least one second light-emitting diode for indicating an electric energy grade of the built-in battery (700); wherein
the microprocessor (100) has a model number of HT46R065;
the boosting circuit (302) includes a boosting chip (U2), a first inductor (L2), a first transistor (Q3), a first MOS tube (Q2) and a first diode (D3);
the boosting chip (U2) has a model number of CP2121;
wherein, a fourth pin of the boosting chip (U2) is connected to a sixth pin of the microprocessor (100), and a base of the first transistor (Q3) via a first resistor (R10), the base of the first transistor (Q3) is also grounded via a second resistor (R9), the first transistor (Q3) is further grounded via its emitter, a collector of the first transistor (Q3) is connected to a gate of the first MOS tube (Q2), to a source of the first MOS tube (Q2) via a third resistor (R8), and to a positive plate of the built-in battery (700), a drain of the first MOS tube (Q2) is connected to a sixth pin of the boosting chip (U2), and to one terminal of the first inductor (L2) via a fourth resistor (R11), other terminal of the first inductor (L2) is connected to a first pin of the boosting chip (U2) and an anode of the first diode (D3) whose cathode is connected to the battery rod charging interface (400); wherein the charging management and over-voltage protection circuit (301) includes a charging management chip (U1), a second diode (D2), a second inductor (L1) and a second MOS tube (Q1);

the charging management chip (U1) has a model number of HB6293A; wherein a first pin of the charging management chip (U1) is connected to a twentieth pin of the microprocessor (100), a second pin of the charging management chip (U1) is connected to a nineteenth of the microprocessor (100), a third pin of the charging management chip (U1) is grounded via a first capacitor (C3), and connected to a positive plate of an external power supply (500) via a fifth resistor (R1), a fourth pin of the charging management chip (U1) is connected to a grid of the second MOS tube (Q1), a seventh pin of the charging management chip (U1) is connected to a positive plate of the built-in battery (700), an eighth pin of the charging management chip (U1) is grounded via the second capacitor (C6), and connected to one terminal of the second inductor (L1), a VCC terminal of the external power supply (500) is connected to an anode of the second diode (D2) via the fifth resistor (R1), the cathode of the second diode (D2) is connected to a source of the second MOS tube (Q1), whose drain is connected to one terminal of the second inductor (L1), other terminal of the second inductor (L1) is connected to the eighth pin of the charging management chip (U1) and to the positive plate of the built-in battery (700) via a sixth resistor (R3); wherein the built-in battery low-voltage detection circuit (306) further includes a seventh resistor (R6) and an eighth resistor (R7); wherein, the seventh resistor (R6) is connected to a positive plate of the built-in battery (700) via one terminal and connected to a second pin of the microprocessor (100) and one terminal of the eighth resistor (R7) via other terminal, the eighth resistor (R7) is connected to a fifteenth pin of the microprocessor (100) via other terminal; wherein the Hall sensor module (200) includes a Hall element (U6), a third capacitor (C15) and a ninth resistor (R18); and wherein the Hall element (U6) is connected to a positive plate of the built-in battery (700) via an inputting terminal, and to a first pin of the microprocessor (100) via an outputting terminal, and is grounded via a Vss terminal, the outputting terminal of the Hall element (U6) is connected to the inputting terminal of the Hall element (U6) via the ninth resistor (R18), the Vss terminal of the Hall element (U6) is connected to the inputting terminal of the Hall element (U6) via the third capacitor (C15).

\* \* \* \* \*